United States Patent [19] [11] Patent Number: 5,188,493
Heel et al. [45] Date of Patent: Feb. 23, 1993

| | | |
|---|---|---|
| [54] | TOOL HOLDER OF MODULAR CONSTRUCTION FOR DRIVEN TOOLS | |
| [75] | Inventors: | Helmut Heel, Lengenwang; Hans Kettel, Kempten, both of Fed. Rep. of Germany |
| [73] | Assignee: | Ott Maschinentechnik GmbH, Kempten, Fed. Rep. of Germany |
| [21] | Appl. No.: | 742,619 |
| [22] | Filed: | Aug. 8, 1991 |
| [30] | Foreign Application Priority Data | |
| | Aug. 31, 1990 [DE] Fed. Rep. of Germany ... 9012522[U] | |
| [51] | Int. Cl.⁵ .................................................. B23C 7/00 | |
| [52] | U.S. Cl. ........................... 409/230; 29/27 C; 82/158; 409/201; 409/215; 483/32 | |
| [58] | Field of Search ...................... 29/27 C, 50, 53, 55; 409/232, 234, 231, 230, 215, 144, 213, 202, 203; 279/143, 144, 145; 82/158, 160; 483/31, 32 | |

[56] References Cited

U.S. PATENT DOCUMENTS

| | | | |
|---|---|---|---|
| 2,669,162 | 2/1954 | Arliss ................................ | 409/215 X |
| 3,589,237 | 6/1971 | Strohecker et al. .............. | 409/144 X |
| 3,690,220 | 9/1972 | Escobedo ........................ | 409/215 X |
| 3,757,637 | 9/1973 | Eich et al. ....................... | 409/233 X |
| 4,557,645 | 12/1985 | Marsland ........................ | 409/230 X |
| 4,635,329 | 1/1987 | Holy et al. ...................... | 29/27 C |
| 4,709,465 | 12/1987 | Lewis ............................... | 29/568 |
| 4,856,153 | 8/1989 | Gusching ........................ | 29/27 C X |

FOREIGN PATENT DOCUMENTS

| | | | |
|---|---|---|---|
| 124539 | 7/1984 | Japan ................................. | 409/230 |
| 85845 | 5/1985 | Japan ................................. | 409/230 |
| 256435 | 10/1990 | Japan ................................. | 409/230 |
| 1451392 | 9/1976 | United Kingdom ................. | 409/230 |

*Primary Examiner*—William Briggs
*Attorney, Agent, or Firm*—Flynn, Thiel, Boutell & Tanis

[57] ABSTRACT

The tool holder of modular construction of driven tools for use on lathes consists at least of one base holder and various tool heads connectable interchangeably therewith. The base holder has a fixing shank, an attachment flange connected thereto, as well as a drive shaft rotatably mounted therein. Each tool head has at least one rotatable tool receptacle in a housing and a drivable shaft connected thereto. On the mutually facing ends of the drive shaft and the driven shaft there are provided coupling parts which can couple without relative rotation therebetween. The driven shaft is provided on the input side with a support pin freely projecting beyond the associated coupling part. The drive shaft is provided in the region of the attachment flange with a coaxial support bore, into which is received the support pin of the tool head.

12 Claims, 7 Drawing Sheets

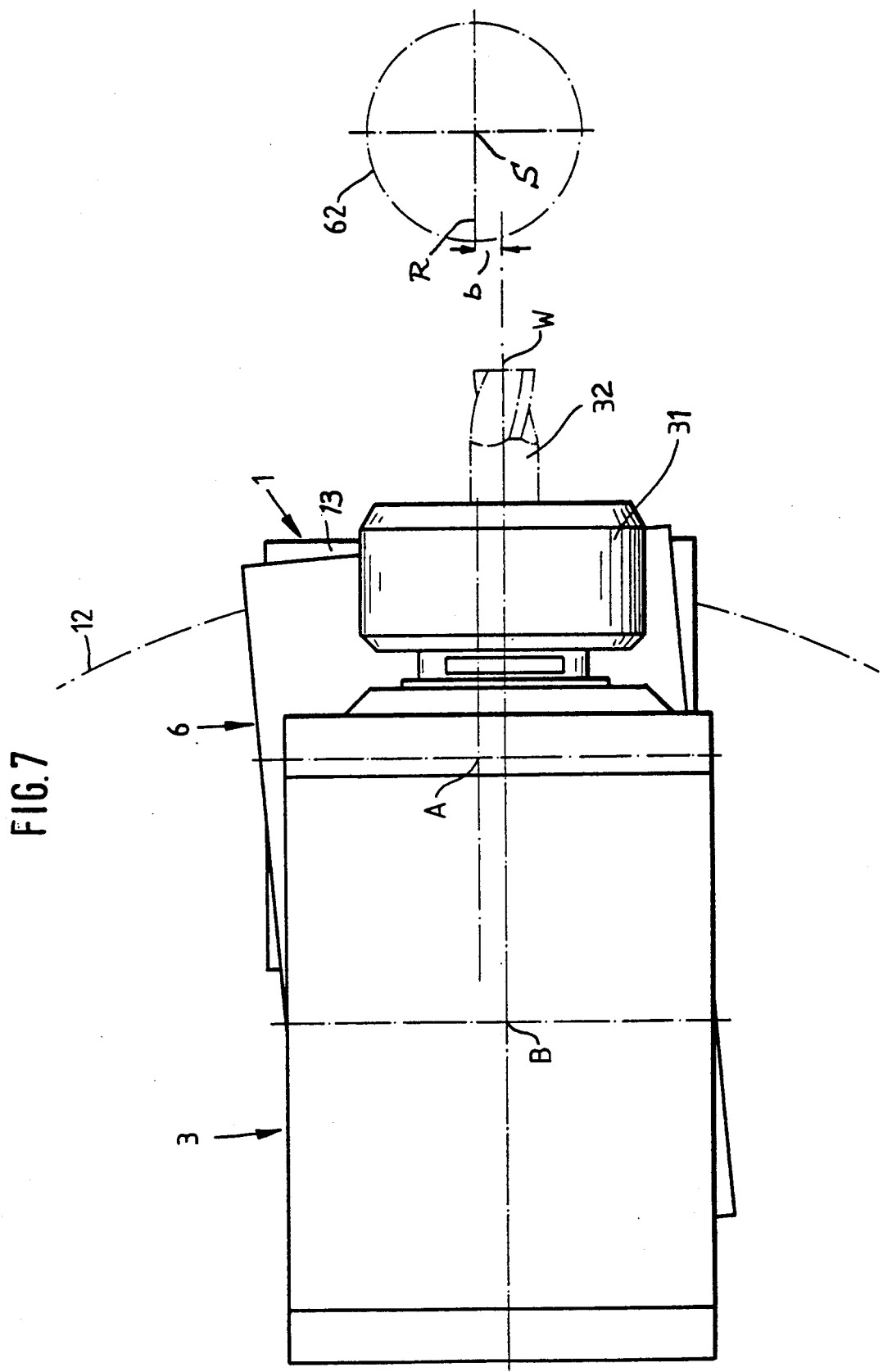

TOOL HOLDER OF MODULAR CONSTRUCTION FOR DRIVEN TOOLS

FIELD OF THE INVENTION

This invention relates to a tool holder of modular construction for driven tools for use on lathes, with a base holder, which comprises a fixing shank or the like adapted to fit in a receptacle of the lathe, an attachment flange coaxially adjoining the same, as well as a drive shaft rotatably mounted in this flange and the fixing shank, with a plurality of different tool heads connectable interchangeably with the attachment flange directly or if desired with the interposition of at least one intermediate part, each tool head comprising at least one rotatable tool receptacle rotatable in a housing and a drivable shaft in driving connection therewith, rotatably mounted in the housing, and with coupling parts on the mutually facing ends of the drive shaft and the driven shaft, adapted to be non-rotatably coupled together by axial engagement, wherein a one or two-part intermediate shaft is rotatably mounted in a housing of the intermediate part, with coupling parts on the input and output ends adapted to couple with the aforesaid coupling parts.

BACKGROUND OF THE INVENTION

Modern lathe comprise a tool turret or a similar receiving device for simultaneous reception of a large number of tools. These tools are brought into the working position one after the other by indexing the tool turret, so that a workpiece can be machined by the different tools in turn without tool changing. In order to be able to carry out a final machining of the workpiece as far as possible in a single cut in the lathe, tool holders can also be fitted in the receptacles of the tool turret which can receive driven tools, such as drills, mills and screw-cutting tools. The drive for these driven tools clamped in the tool holder is effected through a drive shaft rotatably mounted in the base holder and whose input end projecting out of the fixing shank of the base holder can be coupled to a rotary drive provided in the tool turret. Since the receptacles for the tool holders in the tool turrets take the most varied forms, the fixing shanks of the tool holders must also be adapted to the receptacles of the tool turret in question. The tool holders themselves are formed in the most varied manner according to the machining requirements. There are for example tool holders in which the driven tools are arranged coaxially or axially parallel or radially relative to the axis of the fixing shank. Furthermore, for certain machining requirements a gear must be provided between the drive shaft of the fixing shank and the tool, with which the speed of rotation of the drive shaft is stepped up or stepped down.

On account of this number of different receptacles and differently formed tool holders, tool holders of modular construction are known (brochure of the firm WTO WERKZEUG-EINRICHTUNGEN GmbH, D-7600 Offenburg, "WTO-Präzisions-Werzeugeinrichtungen" [WTO Precision Tool Devices]), in which the user of these tools can assemble a tool holder corresponding to the current machining requirements from individual modules. Such modules are base holders with variously formed fixing shanks, on to which can be fixed tool heads for drills and mills, tool heads with thread-cutting devices, angle, drilling and milling devices, tool heads with a plurality of spindles, eccentric rotary heads and the like. An intermediate part containing a gear can moreover be fitted between the base holder in question and the tool head in question. There are also intermediate parts with step-up gears and the same with step-down gears, as well as intermediate parts with so-called offset gears, with which the tool head can be mounted radially offset relative to the axis of the fixing shank. The number of the multi-formed modules, from which the user can himself assemble a tool holder matching the current machining requirements, is not specified here exhaustively.

The driven shaft provided in the tool head and also the intermediate shaft in the intermediate part must as a rule be mounted in at least two bearings. In order thereby to achieve a good and solid bearing, especially of the driven shaft in the tool head, which mostly also serves to receive the tool, the two bearings must be arranged at the greatest possible axial spacing from one another. However the axial structural length in the direction of the axis of the fixing shank is thereby increased, so that a tool holder assembled from a plurality of modules projects relatively far out from the tool turret. The greater the projection, the smaller the rigidity of the tool holder in question. With a reduced rigidity the machining accuracy also suffers. Moreover a greatly projecting tool holder leads to long setting traverses, which increase the machining time. Finally, greatly projecting tool holders can also collide more easily with other machine parts.

The invention is therefore based on the problem of providing a tool holder of modular construction for driven tools for use on lathes, of the kind initially referred to, in which, in order to increase rigidity, the modules adapted to fit on the base holder have the smallest possible structural length in the direction of the fixing shank, nevertheless with provision of optimum support, especially of the driven shaft but also of the intermediate shaft.

This is achieved according to the invention in that the driven shaft and the intermediate shaft are provided at the input end on their ends in each case facing the attachment flange with a support pin of the same diameter, each freely projecting beyond the associated coupling part to the respectively adjoining module, and in that the drive shaft and the intermediate shaft are each provided, respectively in the region of the attachment flange and at their ends facing the respective tool head, with a coaxial support bore, in which the support pin of the respectively adjacent module can be inserted with a fit.

Through the fitting engagement of the support pin in the support bore of the drive shaft or of the intermediate shaft there is obtained an optimum support of the driven shaft and also of the intermediate shaft of relatively great axial length, at the same time with shortening of the axial structural length of the tool head or of the intermediate part. The optimum support of the driven shaft of the tool head has above all essential advantages when the driven shaft also includes at the same time the tool receptacle for a drill or mill. The driven shaft then in fact acts as a drilling or milling spindle and a stiffer mounting and hence also a greater machining accuracy result from the additional support of this shaft in the support bore of the adjacent module. Through the additional support of the driven shaft or of the intermediate shaft, bearings provided in the tool head or intermediate part for these shafts can also be arranged at a smaller axial spacing from one another, which leads to shortening of the axial structural length of the individual modules and thus of the complete tool holder. Through this the rigidity of the tool holder assembled from the modules is increased and the further disadvantages associated with tool holders projecting farther are avoided.

BRIEF DESCRIPTION OF THE DRAWINGS

The invention is explained in more detail below, with reference to several embodiments shown in the drawings. in the drawings.

FIG. 7 is a front view of an assembled tool holder in the direction VII of FIG. 5.

DETAILED DESCRIPTION

Figure 1:
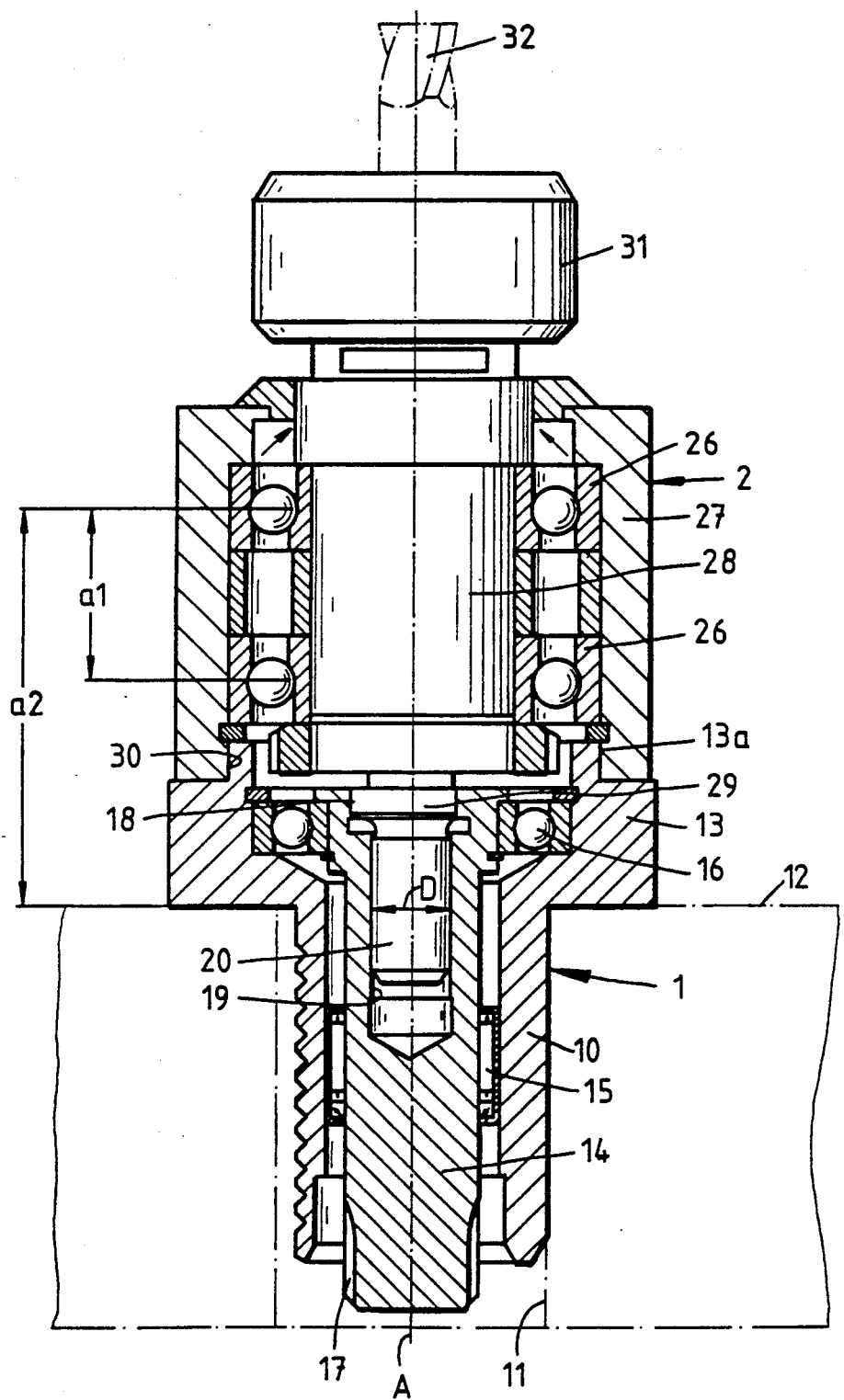
FIG. 1 is an axial section of a tool holder assembled from a base holder and tool head.

Not only the structure of the tool holder according to the invention but also how the most varied tool holders can be assembled from the different modules will be explained with reference to the drawings; however the range of variation is not to be limited to the examples shown in the drawings. Each tool holder consists at least of a base holder 1 and a tool head 2 or 3. Between the base holder 1 and the tool head 2, 3 in question there can be fitted intermediate parts 4, 5, 6, which each include gears, and/or an intermediate part 7 (FIG. 6) which contains a coolant feed. The arrangement between the base holder 1 and the tool head 2, 3 of two intermediate parts each containing gears is also possible, for example the intermediate part 6 with the offset gear in combination with the intermediate part 4 having the step-down gear or the intermediate part 5 having the step-up gear.

The base holder comprises a fixing shank 10 or the like, with which it can be fitted into a receptacle 11 of the tool turret 12 of a lathe. Basically the fixing shank 10 is matched in shape and size to the current receptacle 11, whereby the most varied connections customary in tool/machine tool interfaces are feasible. The fixing shank could also be formed as a fixing part which can be screwed on to the tool turret. Connected coaxially to the fixing shank 10 is an attachment flange 13, which has a centering rim 13a for each module to be fixed on the attachment flange 13, namely a tool head 2, 3 or an intermediate part 4-7. The axial connection of the individual modules 1-7 to each other can be effected by axially directed screws, not shown. Within the fixing shank 10 and the attachment flange 14 a drive shaft 14 is rotatably mounted by means of bearings 15, 16 provided in the fixing shank 10 and in the attachment flange 13. The drive shaft 14 is keyed or the like at 17 on the input end for coupling to a rotary drive, not shown, of the lathe. Furthermore the drive shaft 14 has at its output end a coupling part 18 in the form of an internal polygonal shape. Adjoining this coupling part 18 is a support bore 19, whose diameter corresponds to the diameter D of a support pin 20, 21, 22, 23, 24, 25, adapted to be inserted in the support bore 19.

The tool head 2 comprises a driven shaft 28 mounted by means of the bearings 26 in the housing 27. This driven shaft 28 is provided at its input end facing the attachment flange 13 with a coupling part 29 formed as an external polygon shape. The support pin 20 connects to this coupling part and projects freely towards the respective adjoining module, here the base holder 1. In order to ensure modular construction of the most varied tool holders, the support pin 20 has the same diameter as the support pins 21-25 of the other modules 3-7. The housing 27 is provided at its end facing the attachment flange 13 with a centering bore 30 matching the centering rim 13a. In the tool head 2 illustrated in FIG. 1 the driven shaft 28 has furthermore a tool receptacle 31, in which can be fixed a tool 32, for example a mill or a drill.

The driven shaft 28 is supported radially by means of the bearings 26 with an axial spacing of a1. In the assembled state, as is shown in FIG. 1, the support pin 20 of the driven shaft 28 engages with a fit in the support bore 19 of the drive shaft 14. There thus results a further radial support of the driven shaft such that a substantially greater axial spacing a2 of the two outermost radial supports arises. The driven shaft 28 is thus supported at a greater axial spacing a2 and a higher rigidity of the bearing results. The torque is transmitted from the drive shaft 14 through the inter-engaging coupling parts 18, 29 to the driven shaft 28. In the angle tool head illustrated in FIG. 2, the tool axis W is arranged at right angles to the axis A of the base holder 1. Parts of like function are indicated by the same reference numerals as in the previously described embodiment, with the exception of the support pin 21, so that the above description applies in substance. Although only a single bearing 26 is here provided for the driven shaft 28, an additional radial support at greater spacing a3 from the single bearing 26 is here obtained by the engagement of the support pin 21 in the support bore 19, and hence a good support of the driven shaft 28. Through this a relatively short axial structural length of the tool head 3 is obtained in the direction of the axis A of the base holder 1.

Figure 2:
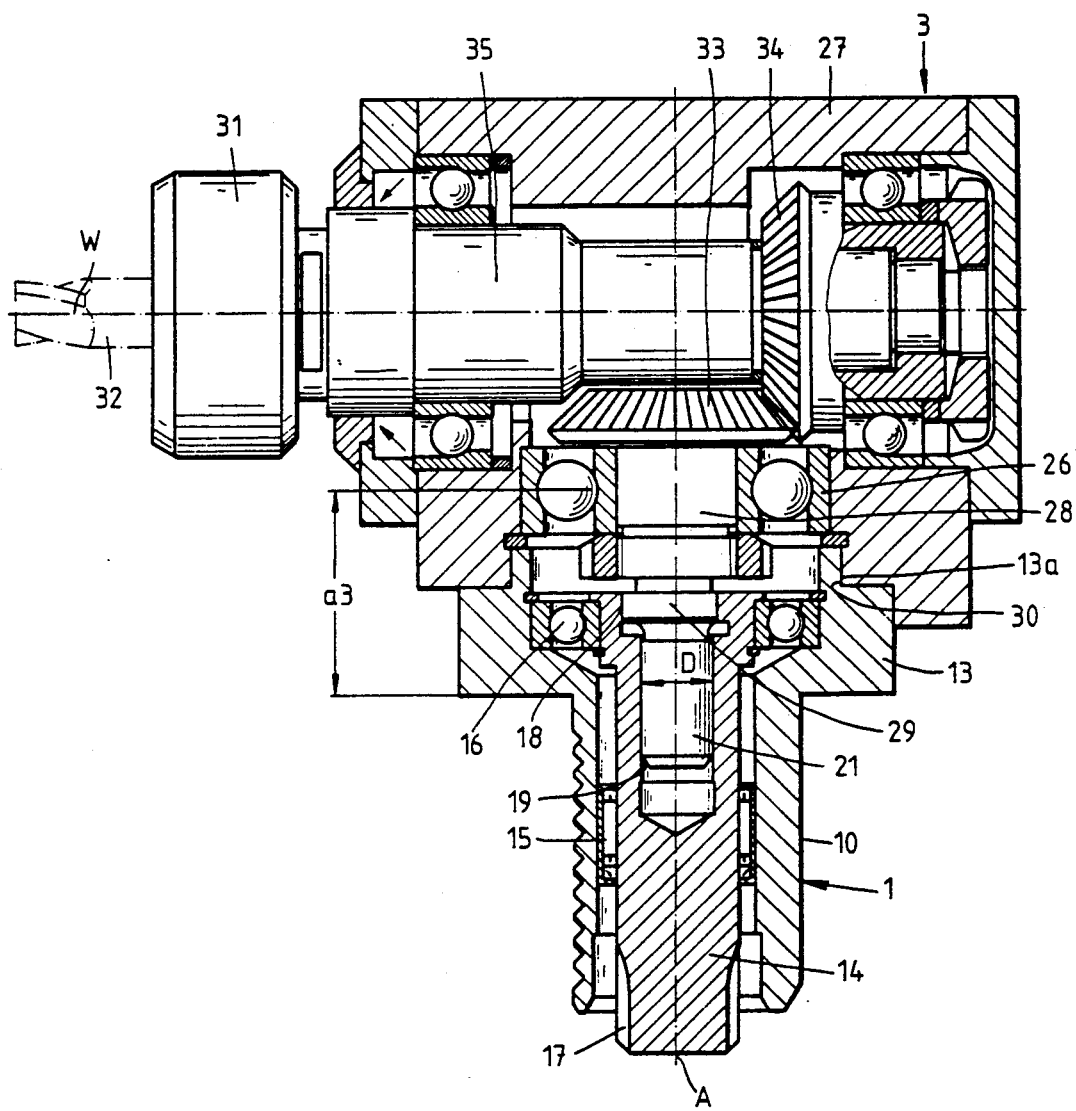
FIG. 2 is an axial section of a tool holder assembled from a base holder and angle tool head.

In the angle tool head illustrated in FIG. 2, the driven shaft carries a bevel gear 33, with which it drives the radial spindle 35 via the bevel gear 34. This carries the tool receptacle 31 at its free end. Instead of a single radial spindle 35 a plurality of radial spindles could be provided, just as a plurality of axially directed spindles with tool receptacles could be provided in a tool head, driven from the driven shaft.

Figure 3:
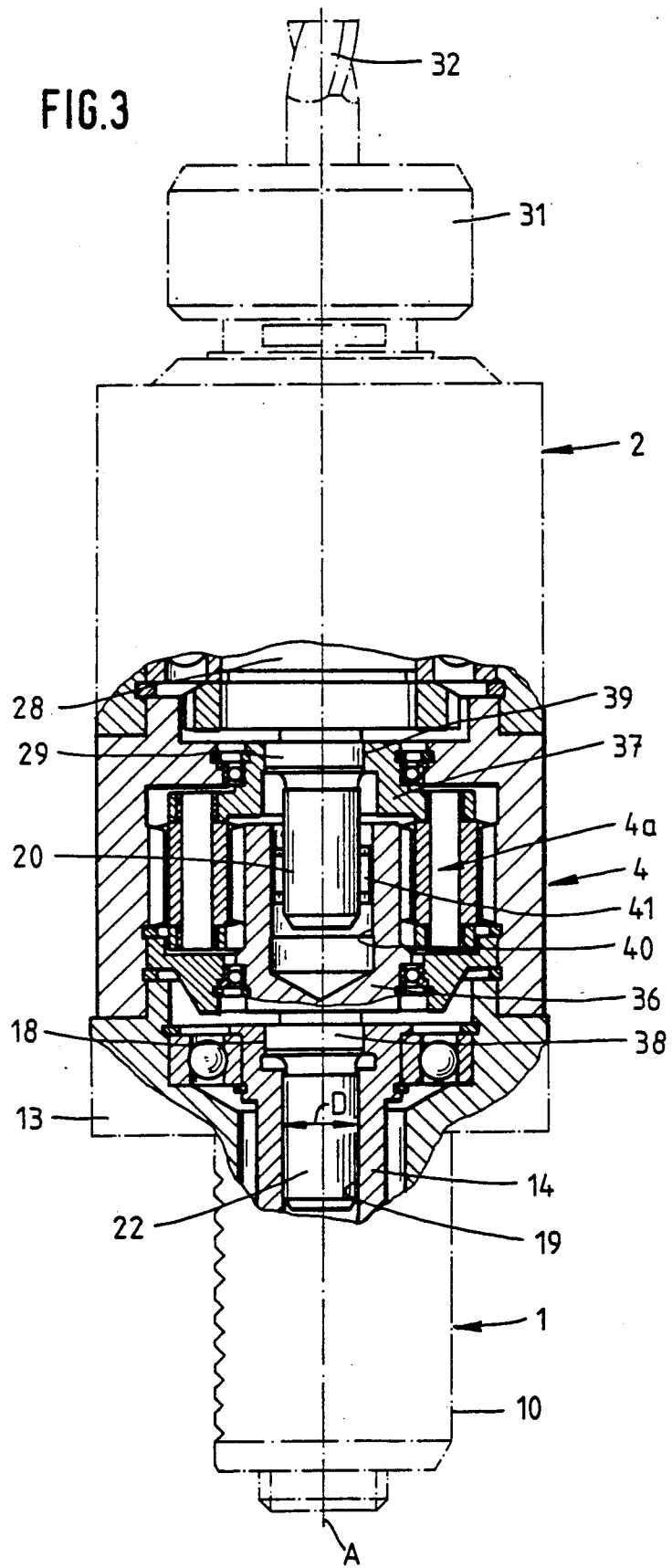
FIGS. 3 and 4 illustrate assembled tool holders provided with a step-down gear and a step-up gear, respectively, between the base holder and the tool head.

In the embodiment shown in FIG. 3 an intermediate part 4 is arranged between the base holder 1 and the tool head, having a step-down gear 4a in the form of a planetary gear. The intermediate part 4 has an intermediate shaft consisting of two shafts parts 36, 37. The shaft part 36 is provided at the input end with the coupling part 38 formed as an external polygonal shape, on which the freely projecting support pin 22 adjoins. The other shaft part 37 comprises a coupling part 39 formed as an internal polygon shape. The coupling parts 38, 39 correspond in their form and size to the coupling parts 28 and 18 of the embodiments shown in FIGS. 1 and 2. The shaft part 36 has further a support bore 40. Since however with this step-down gear the intermediate shafts 36, 37 rotate with different speeds, a needle bearing 41 is provided between the support bore 40 and the support pin which is in engagement in this support bore, e.g. the support pin 20 of the tool head 2. Here again there results an additional radial support of the driven shaft 28 of the tool head 2, through the support pin 20 engaging in the support bore 50 [40] with the interposition of the needle bearing 41. Moreover the intermediate shaft part 36 is also supported by its support pin 22 engaging in the support bore 19.

Figure 4:
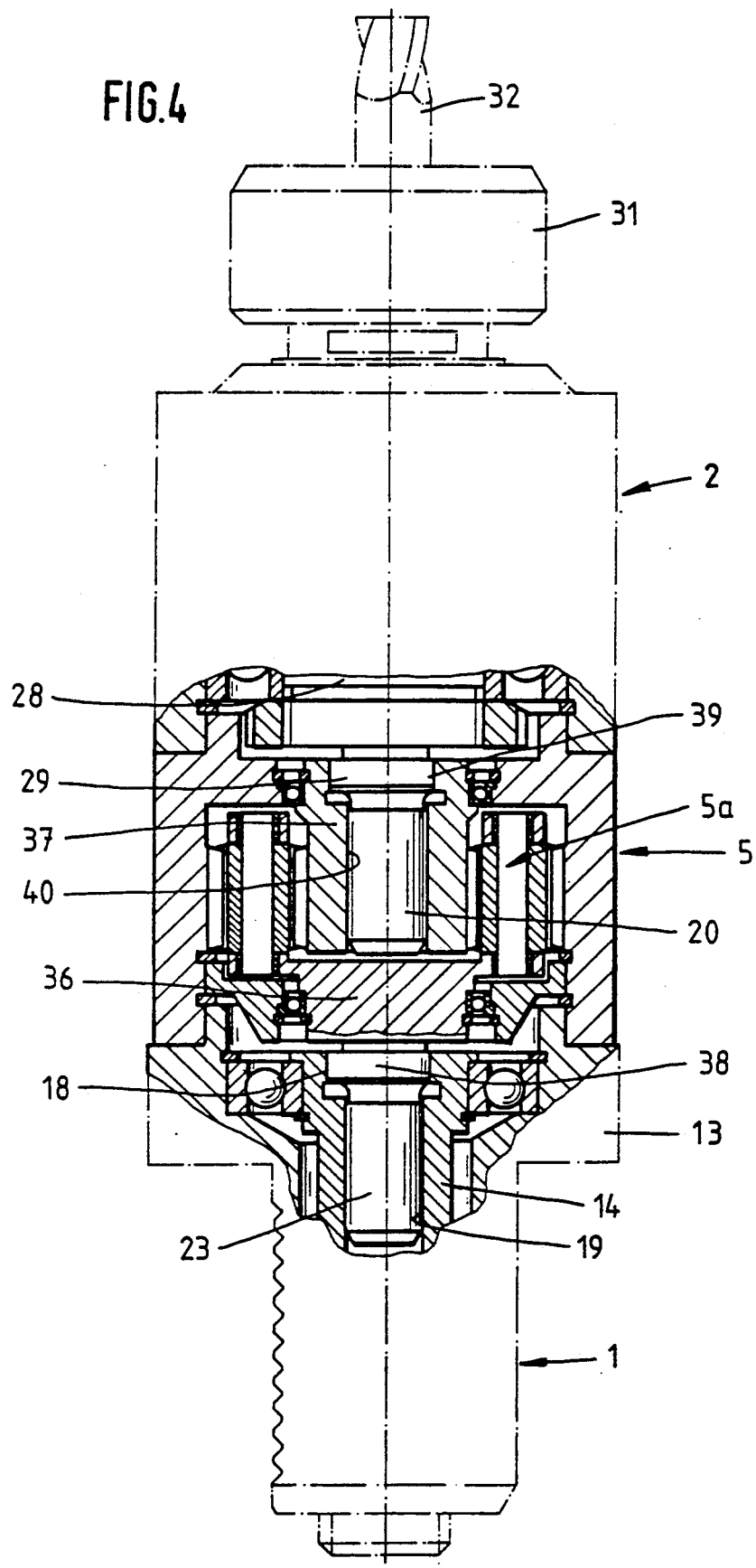

In the embodiment shown in FIG. 4, the intermediate part 5 has a step-up gear 5a formed as a planetary gear. Parts of like function are also designated with the same reference numerals here, as were employed in the description of the embodiment shown in FIG. 3. In the embodiment shown in FIG. 4 the intermediate shaft parts 36, 37 do indeed likewise rotate with different speeds but the support bore 40 can here be arranged in the output end intermediate shaft part 37, which rotates synchronously with the support pin 20 on account of the inter-engaging coupling parts 29, 39. In consequence no needle bearing is needed here.

Figure 5:
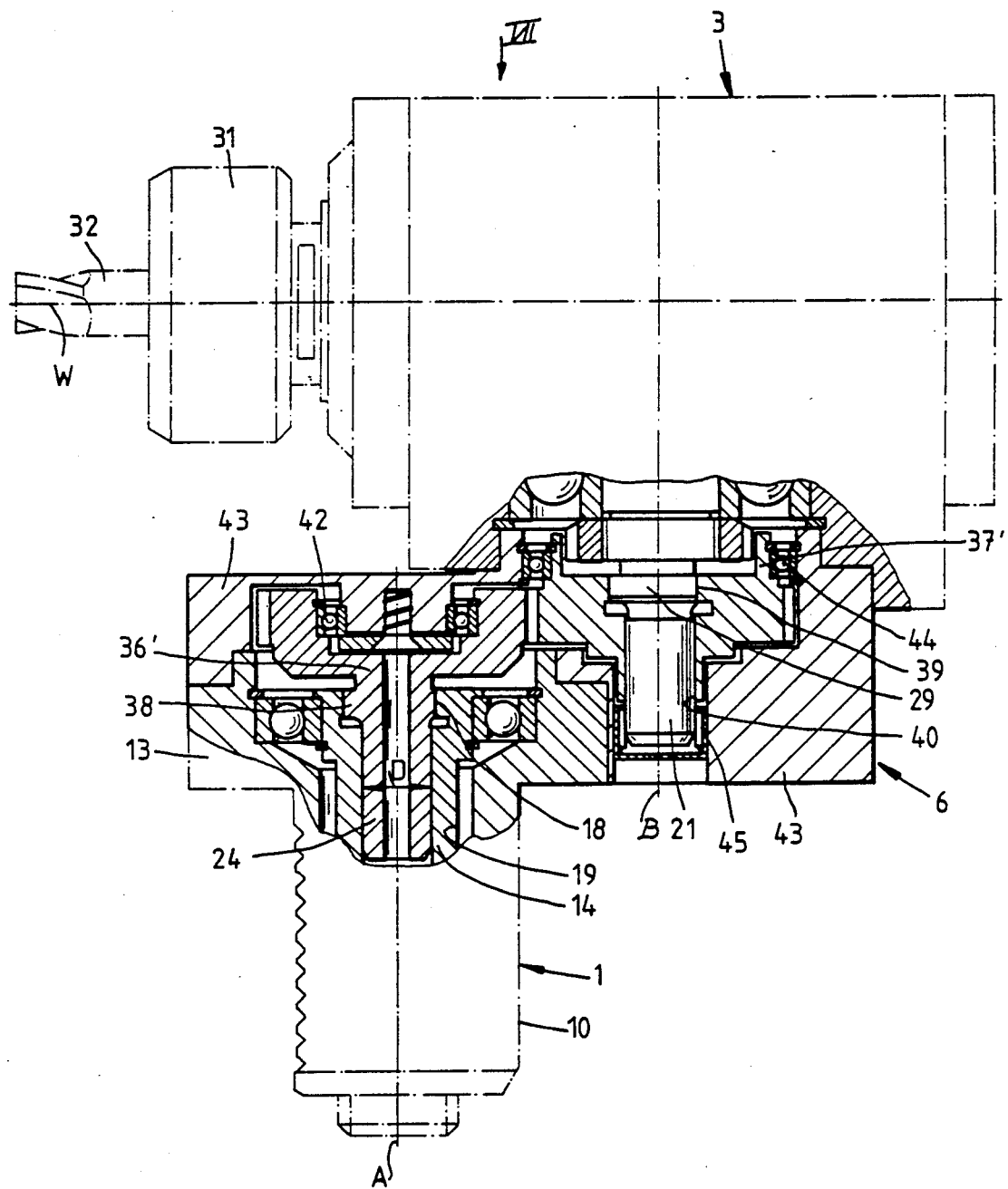
FIG. 5 illustrates an assembled tool holder with an offset gear arranged between the base holder and an angle tool head.

In the embodiment shown in FIG. 5 the intermediate part 6 is formed as a so-called offset gear, in which the intermediate shaft parts 36', 37' are not arranged coaxial with one another, but axially parallel to one another. The support pin 24 is provided on the input side intermediate shaft part 36' and engages with a fit in the support bore 19 of the base holder. Through this there arises a radial support of the intermediate shaft part 36', so that this needs to be supported only by a single bearing 42 in the housing 43. The axial structural length of the intermediate part 6 is thereby reduced. The output side intermediate shaft part 37' is likewise supported in the housing 43 by only one bearing 44. In this case the support pin 21 does not only engage in a support bore 40 of the intermediate shaft part 37' but also in a needle bearing 45, which is provided in the housing 43. Through this needle bearing 43 [45], which, for reasons of space, engages on the support pin 21, not only the latter but also the intermediate shaft part 37' are additionally radially supported.

Figure 6:
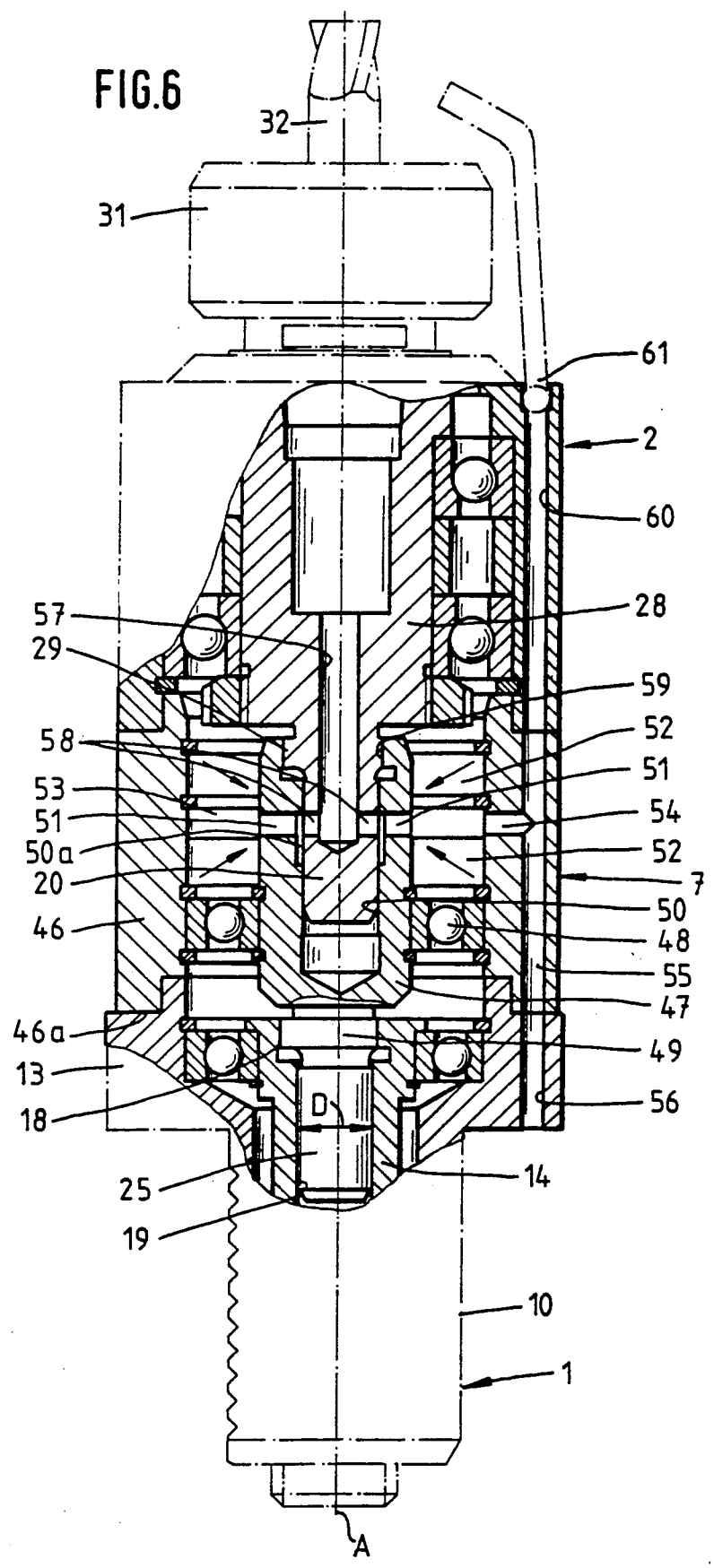
FIG. 6 illustrates an assembled tool holder with a coolant feed arranged between the base holder and an angle tool head.

With reference to FIG. 6 it will be shown that the construction according to the invention also allows a central coolant feed to the tool 32 by means of a suitable formed intermediate part 7. In the housing 46 of this intermediate part the intermediate shaft 47 is rotatably supported by means of the bearing 48. It carries at its input end the coupling part 49 and the support pin 25. The intermediate shaft 47 is provided with a support bore 50. In an enlarged annular space 50a of this support bore 50 there open two radial bores 51. The intermediate shaft 47 is surrounded by two axially spaced seals 52, which are arranged between intermediate shaft 47 and housing 46. An annular space 53 is delimited between the two seals 52, into which opens a radial feed bore 54 provided in the housing 46. Advantageously there is further provided in the housing 46 an axially parallel feed channel 55, connected to the feed bore 54 and which opens at the end face 46a of the housing 46 in the attachment flange 13. This feed channel 55 runs into a further feed channel 56 provided in the attachment flange 13. Through the feed channels 56, 55, the feed bore 54, the annular space 53 and the radial bores 51, coolant/lubricant can be fed to the enlarged part 50a of the support bore 50. The driven shaft 28 of the tool head 2 has a central coolant/lubricant channel 57, which extends into the support pin 20 and is connected to the space 50a through radial bores 58. If desired the coolant/lubricant feed could also be effected in that the radial feed bore 54 in the housing 46 is led to the outside and there can be connected by a releasable hose coupling to a feed hose for coolant/lubricant.

Additionally or instead of the above-described central coolant/lubricant feed, the coolant/lubricant can also be fed to the tool 32 de-centrally if desired. To this end the tool head has a feed channel 60 running into the feed channel 56 or 55 and on to which is screwed the pipe 61. Coolant/lubricant can be fed through this pipe 61 to the tool 32 from the outside. If desired the tube 61 can also be removed and the feed channel 60 be closed by a threaded rod. If only the decentralised coolant/lubricant feed from the outside, then the intermediate part 7 can be dispensed with and the feed channel 60 is then connected directly to the feed channel 56 of the attachment flange 13.

With an angle tool head 3, as it is shown in FIG. 5, normally only machining can be undertaken in which the tool axis W runs exactly radially to the workpiece axis. However machinings are also often required in which the tool axis W has to be offset relative to the workpiece axis of the workpiece 62 by an amount b, as is shown in FIG. 7. This kind of machining, which is called off-center machining below, is not possible with the previously known modular tool holders. In order to make such off-center machining possible, the intermediate part 6 formed as an offset gear is pivotal relative to the attachment flange 13 of the base holder 1 about the axis thereof and can be fixed in the pivoted position relative to the base holder 1. Moreover the angle tool head 3 is also pivotal relative to the intermediate part 6 about an axis B running parallel to the axis A of the base part. The axis B pertains to the axis of the intermediate shaft part 37' shown in FIG. 5. The angle tool head 3 is also adapted to be fixed in the adjusted pivotal position relative to the intermediate part 6. Through this the tool 32 can be brought into the position shown in FIG. 7, in which the tool axis W does not intersect the axis S of the workpiece 62, but runs at a distance b parallel to a radius R of the workpiece.

The embodiments of the invention in which an exclusive property or privilege is claimed are defined as follows:

1. In a tool holder of modular construction for driven tools having a base holder with a fixing shank adapted to fit in a receptacle of a tool machine, said base holder having an attachment flange arranged coaxially with the fixing shank, a drive shaft rotatably mounted in the attachment flange and the fixing shank, a plurality of different modules interchangeably connectable with the attachment flange, each module comprising a housing having means defining at least one rotatable receptacle and a driven shaft therefor in driving connection therewith, rotatably mounted in the housing, and coupling means on mutually facing ends of the drive shaft and the driven shaft for fixedly connecting together the drive and driven shafts, the improvement wherein the driven shaft is provided at an input end thereof facing the attachment flange with a support pin freely projecting beyond the coupling means to the respectively adjoining module, and wherein the drive shaft is provided, in the region of the attachment flange and at an end thereof facing the module, with a coaxial support bore into which is received the support pin.

2. The tool holder according to claim 1, wherein the axial length of the support pin is at least as great as its diameter.

3. The tool holder according to claim 2, wherein the axial length of the support pin is approximately twice its diameter.

4. The tool holder according to claim 1, wherein the respectively adjoining module is a series connected intermediate part and a tool head, the intermediate part being connected between the base part and the tool head, the intermediate part having the driven shaft therein and the support pin, wherein the tool head has a further driven shaft rotatably supported on the tool head, and wherein a further coupling means is provided for interconnecting the driven shaft to the further driven shaft.

5. The tool holder according to claim 4, wherein the further driven shaft is provided at an input end thereof with a further support pin freely projecting beyond the further coupling means, and wherein the drive shaft is provided, in the region of the tool head, with a further support bore into which is received the further support pin.

6. The tool holder according to claim 4, wherein the intermediate part includes gear transmission means for transmitting a ratioed drive between the driven shaft and the further driven shaft.

7. The tool holder according to claim 4, wherein the further driven shaft of the tool head has a central coolant-lubricant channel wich extends into the further support pin, wherein the intermediate part is formed as a coolant-lubricant feeder, the driven shaft having at least one radial bore opening into the further support bore, wherein the driven shaft is surrounded by an annular space in the region of the radial bore and delimited by axially spaced seals arranged between the driven shaft and the housing, and wherein a radial feed bore provided in the housing opens into the annular space.

8. The tool holder according to claim 7, wherein there is provided in the housing a feed channel extending parallel to an axis of the drive shaft and leading to the feed bore and which opens at an end face of the housing facing the attachment flange and into a feed channel provided in the attachment flange.

9. The tool holder according to claim 4, wherein the intermediate part includes gear transmission means for transmitting a ratioed drive between the driven shaft and the further driven shaft, wherein the driven shaft is laterally offset from and parallel to the drive shaft, wherein the driven shaft is connected to an angle tool head in which a tool axis is arranged at right angles to an axis of the drive shaft, and wherein both the intermediate part and the angle tool head are capable of pivoting respectively relative to the attachment flange of the base body about an axis of the attachment flange and relative to the intermediate part about an axis of the driven shaft and can be selectively fixed in the adjusted pivoted position.

10. The tool holder according to claim 1, wherein the respectively adjoining module is a tool head, the means defining at least one rotatable receptacle being a tool receptacle.

11. The tool holder according to claim 4, wherein the coupling means and the further coupling means both have a polygonal shape, wherein the drive shaft and the further driven shaft are each provided with an internal polygonal shape and the input end of the driven shaft and the input end of the further drive shaft are each provided with an external polygon shape.

12. The tool holder according to claim 6, wherein said gear transmission means includes an intermediate shaft, and wherein a needle bearing is provided for supporting the further support pin arranged in the further support bore and for accommodating the different speeds of rotation of the intermediate shaft and the further support bore relative to the further support pin received in the further support bore.

* * * * *

UNITED STATES PATENT AND TRADEMARK OFFICE
CERTIFICATE OF CORRECTION

PATENT NO. : 5 188 493

DATED : February 23, 1993

INVENTOR(S) : Helmut HEEL et al

It is certified that error appears in the above-identified patent and that said Letters Patent is hereby corrected as shown below:

Column 7, line 17; change "drive" to ---driven---.

Column 7, line 21; change "claim 4" to ---claim 5---.

Column 7, line 27; change "wich" to ---which---.

Column 8, line 23; change "4" to ---5---.

Column 8, line 28; change "drive" to ---driven---.

Signed and Sealed this

Fourteenth Day of December, 1993

*Attest:*

BRUCE LEHMAN

*Attesting Officer*     *Commissioner of Patents and Trademarks*